United States Patent [19]
Biglari et al.

[11] Patent Number: 5,565,665
[45] Date of Patent: Oct. 15, 1996

[54] MAGNETIC SUSPENSION SEISMOMETER

[76] Inventors: Haik Biglari; Dorek Biglari, both of 7504 Clubfield Dr., Huntsville, Ala. 35802

[21] Appl. No.: 359,410

[22] Filed: Dec. 20, 1994

[51] Int. Cl.$^6$ ...................................................... G01V 1/18
[52] U.S. Cl. ........................ 181/122; 367/178; 367/185
[58] Field of Search ................................... 367/178, 185; 181/122

[56] References Cited

U.S. PATENT DOCUMENTS

| | | | |
|---|---|---|---|
| 3,626,364 | 12/1971 | Simon et al. | 367/185 |
| 4,497,206 | 2/1985 | Scheurenbrand | 73/382 R |
| 4,979,154 | 12/1990 | Brodeur | 367/116 |

FOREIGN PATENT DOCUMENTS 241720  4/1969  U.S.S.R. .

*Primary Examiner*—Ian J. Lobo

[57] ABSTRACT

The objective of this invention is to simplify and provide a versatile device capable of accurately measuring seismic activity. The technique is based on magnetic levitation. The concept of magnetic levitation has been around since the 1960's, and it has been used extensively for high speed trains, however its use in seismology has been described in U.S. Pat No. 3,626,364 issued to Simon et al. However the present invention utilizes a four-vector magnetic field instead of three separate scalar magnetic fields. The advantages of present approach is reduction of three seismic masses to a single seismic mass.

To detect seismic activity using this concept, a seismic mass must be magnetically suspended. A seismic mass trapped in a magnetic field still possesses its inertia. Therefore, as the magnetic field moves under the influence of seismic activity, the seismic mass will tend to stay in the same place. The controller, however tends to keep the seismic mass in its place. Consequently, the total current in the electromagnets increases to compensate for the seismic action in the z direction. To detect lateral motion, the current in two opposing electromagnetic is subtracted. A secondary way to detect seismic activity is accomplished through the measurement of the position of the seismic mass. This technique is also applicable in measuring acceleration in multiple axis, vibration, detection, and motion detection, exoatmospheric altitude determination and attitude determination in two axis of x and y.

10 Claims, 5 Drawing Sheets

NOTES:

$\zeta = 25$
$\omega = 0.7$

$A = 980$
$B = 9800/1$
$C = 180.06$
$D = 284.5$ $P = D - 2\zeta\omega$ $E = -(P\omega*\omega + AD)/(BC)$ $F = -(2P\zeta + A + \omega*\omega)/(BC)$

MAGNETIC SUSPENSION SEISMOMETER

CROSS REFERENCES TO RELATED APPLICATIONS

U.S. Industrial Outlook, U.S. Department Of Commerce, Washington, D.C. Related Applications:
Ultrasonic Detection System, U.S. Pat. No. 5,121,628
Monopole, Diploe, and Quadrupole Borehole Seismic Transducers, U.S. Pat. No. 5,109,698
Piezoelectric Cylindrical Transducer for Producing or Detecting Asymmetrical Vibrations, U.S. Pat. No. 5,081,391
Three-Axis Seismometer, U.S. Pat. No. 3,626,364
Gravimeter, U.S. Pat. No. 4,497,206
Landing Aid For Aircraft, U.S. Pat. No. 4,979,154

BACKGROUND

1. Field of Invention

This invention relates to seismometers, specifically a seismometer based upon magnetic suspension where the sensitivity associated with each principal axis is adutable.

2. Description of Prior Art

A seismometer is a device that is used to record seismic activities. Conventional seismometers have a mass suspended from a spring. On the end of the mass is a device that records the seismic activity. These seismometers create their own natural frequency and are limited by mechanical friction. Expensive electronic devices can correct this, however, a seismometer utilizing magnetic suspension would not have these problems and furthermore; higher sensitivities may be achieved with this technique which is described in patent U.S. Pat No. 3,626,364 issued to Simon et al. However; the magnetic suspension seismometer invented by Simon et al utilizes three independent seismic masses to detect a seismic activity, in all three axis. Furthermore, the feedback mechanism utilized by Simon et al is strictly proportional and hence not capable of completely replacing any desired mass spring combination. In addition, Simon et al constructed three scalar magnetic fields, while the present invention constructs a single four-vector magnetic field capable of measuring seismic activity with only a single seismic mass in all three axis.

The construction of present invention also naturally lends itself to measurement of gravitational perturbation. Most Prior gravimeters are based on mass and spring combination as described in U.S. Pat No. 4,497,205, issued to Hans Scheurenbrand, Stetten, Fed. These type of gravimeters have a limited range for sensitivity adjustment. This is primarily due to the filet that the stiffness adjustment on the springs are very cumbersome and limited. Other gravimeters use a mass and a restoring force other than spring, such as an arrangement of permanent magnets as described in the German Pat No. 1,230,577. Again such an arrangement will have a very limited range for sensitivity adjustment, due to the fact that the magnetic field of the permanent magnet is predetermined. The present invention utilizes adjustable vector magnetic field as the restoring force mechanism. With this arrangement, a set of virtual springs are realized, that essentially act as springs, but the major advantage is the adjustability of their stiffness and hence the sensitivity of gravimeter may easily be adjusted. Another advantage of the present invention is that the physical spring used in conventional gravimeters change their stiffness over a period of time and requires compensation, with the present invention there is no periodic adjustments.

The present invention being sensitive to gravitational perturbation, may be utilized to measure exoatmospheric attitude not measurable by conventional ultrasonic echo ranging techniques as described by U.S. Pat No. 4,979,154. Since the gravitational force decreases as a function of altitude the current in the electromagnets in the present invention will decease in a predictable manner in higher altitudes. Hence, the total current will be indicative of altitude. The present invention is also sensitive to pitch and roll motion, This is due to the fact that four-vector magnetic field changes its shapes when the structure is tilted to maintain the position of seismic mass, and hence the required current distribution changes providing means to measure angular displacement.

OBJECTS AND ADVANTAGES

This invention replaces the spring and mass combination of conventional seismometers with a four-vector magnetic field realized by set of electromagnets and a single ferromagnetic seismic mass. This eliminates the spring component, which is subject to fatigue. Furthermore, it eliminates the natural frequency associated with mass-spring combination and removes the need for extra electronic devices used to compensate for it. Furthermore, the feedback mechanism of present invention being proportional and derivative type, virtually realizes infinitum of mass and spring combinations. Accordingly, other objects and advantages of this invention are greater accuracy, ease of sensitivity adjustment, and lower cost than conventional seismometers. Still, further objects and advantages will become apparent from a consideration of the ensuing description and accompanying drawings.

REFERENCE NUMERALS

1. Electromagnetic actuation assembly, which is comprised of four 12 VDC, 0.5 Amps electromagnets.
2. Single spherical ferromagnetic seismic mass.
3. Sensor assembly, comprising of four solar cells arranged in a quadrature configuration.
4. Signal conditioning assembly, which is comprised of a 324 Operational Amplifier and twelve resistors.
5. An (X,Y,Z) offset assembly, which is comprised of three pairs of variable resistors.
6. Control system assembly, which is comprised of four controller. Each controller is comprised of two subassembly. Namely, a servo subassembly and an analog computer subassembly.
7. Power supply assembly comprising of three 12 VDC power supplies.
8. Incandescent 12 VDC light bulb.

SUMMARY

This invention presents a novel technique in measuring seismic activity. The technique is based on magnetic levitation. The benefits of applying this technology to seismology is presented in a U.S. Pat No. 3,626,364 issued to Simon et al. The major difference between the present invention and that of Simon et al is the fact that the present invention uses only a single seismic mass while Simon et al use three physically distinct and separated seismic masses. The use of single seismic mass has tremendous ramifications, which includes: versatility of applications, simplicity of construction, reduction of production cost and reduction of operation cost.

PREFERRED EMBODIMENT

Description

Figure 1A:
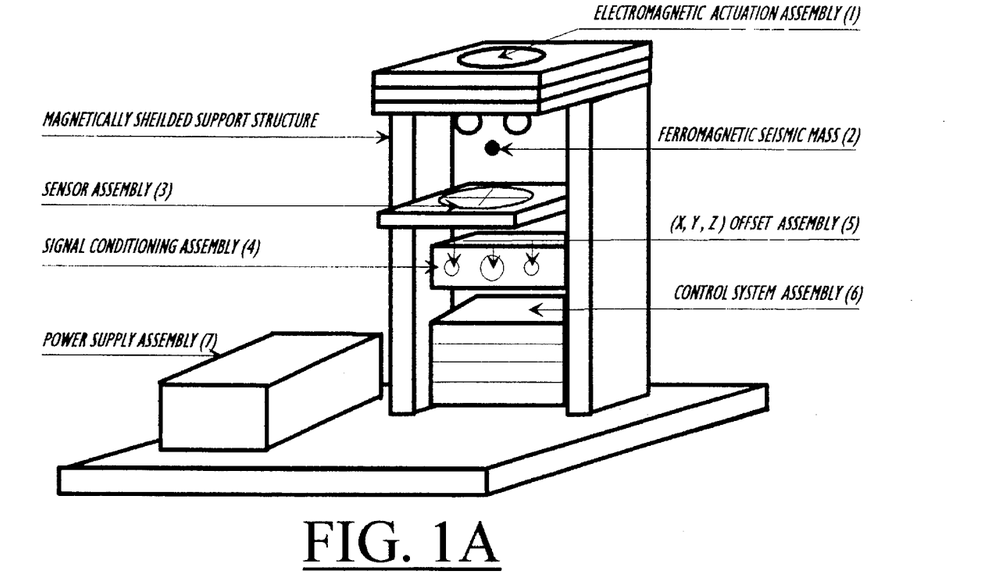
FIG. 1A is a perspective view illustrating the structure and major assemblies.
Figure 1B:
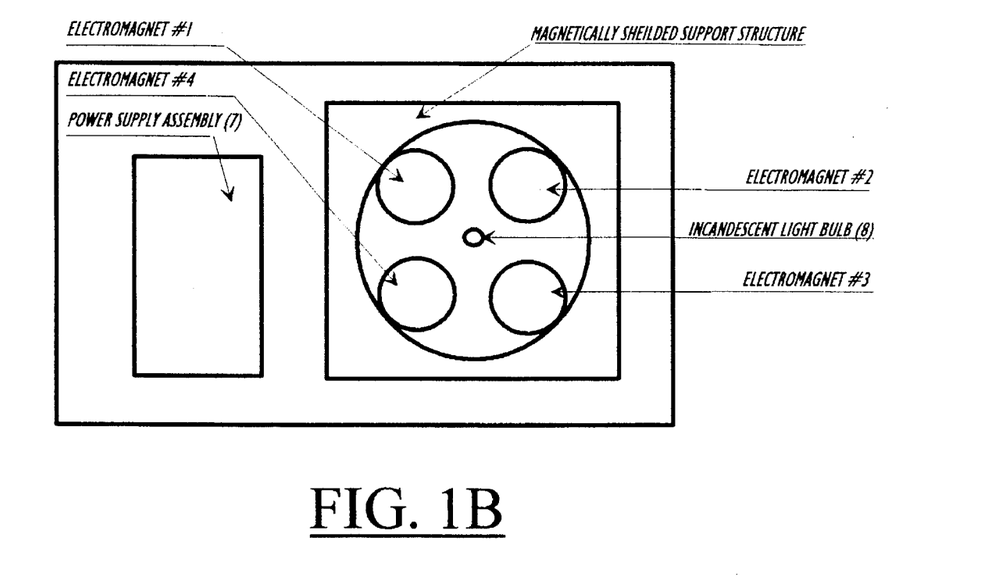
FIG. 1B is a top view of the structure.

In the most general terms, the invention is comprised of a magnetically shielded support structure, a plurality of electromagnets, a plurality of controllers, a sensor assembly which is comprised of a plurality of solar cell quadratures, a signal conditioning assembly, an offset potentiometer for each of the axis (X,Y,Z), a ferromagnetic seismic mass and a plurality of power supplies. FIG. 1 shows the most simple embodiment of the invention.

Figure 2:
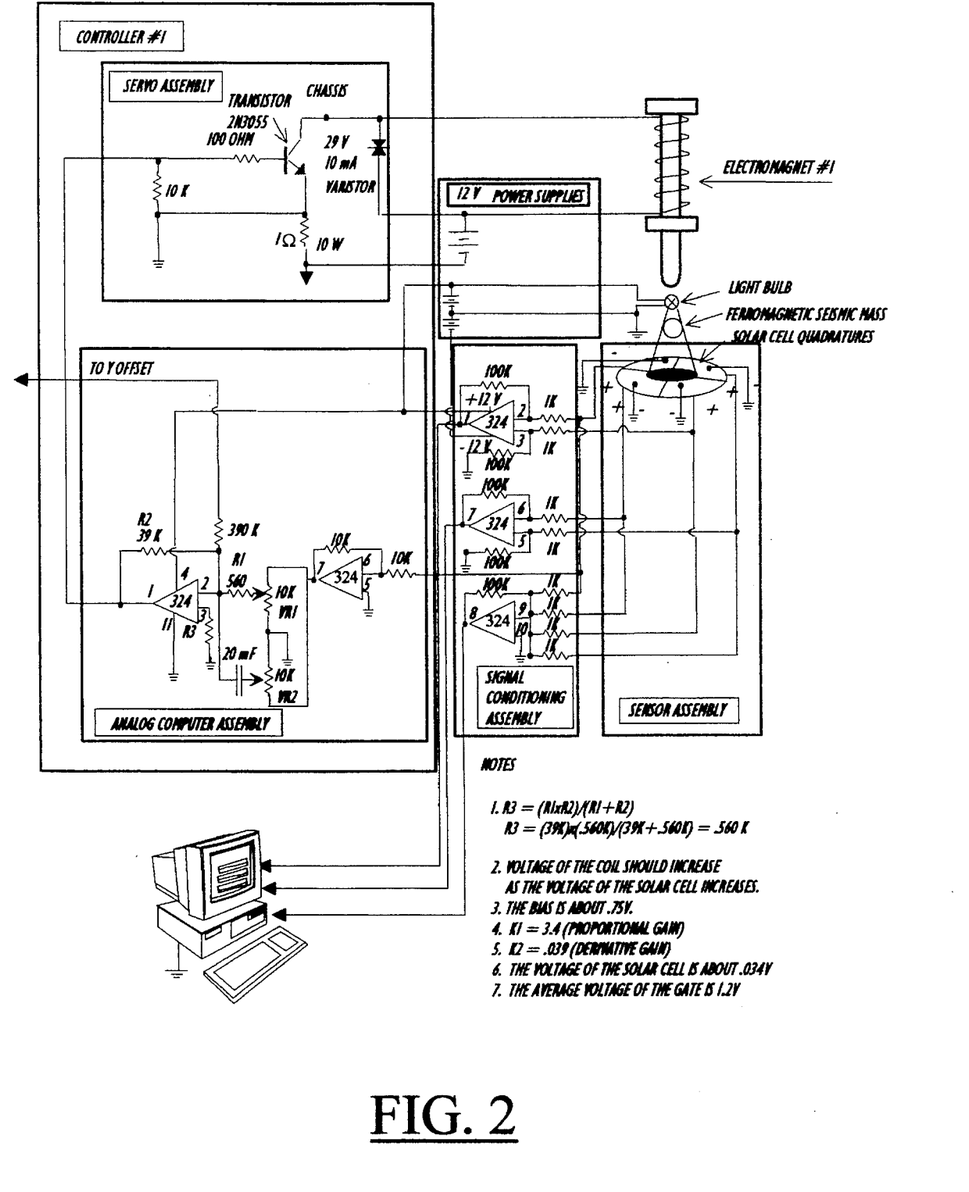
FIG. 2 shows the electrical schematic of the controller #1, the electromagnet #1, the sensor assembly, the signal conditioning assembly, the spherical ferromagnetic seismic mass and power supply.

FIG. 2 shows the electrical schematic of the controller #1 and its electrical connection to sensing and actuation mechanism. The small light bulb (8) located in the bottom of the electromagnetic actuation assembly (1) shines on the spherical ferromagnetic seismic mass (2). The ferromagnetic seismic mass, casts a shadows on the sensor assembly (3). Each quadrant of the sensor assembly produces a voltage which is a function of the position of the seismic mass. In general this function is nonlinear, however if the motion of the seismic mass (2) is kept within a small neighborhood of steady state operation, this relationship becomes linear. The control system assembly (6) is designed in such a way as to ensure that the position of the seismic mass (2) becomes a linear function of voltages produced on each of the solar cell quadrants of sensor assembly (3).

Figure 3:
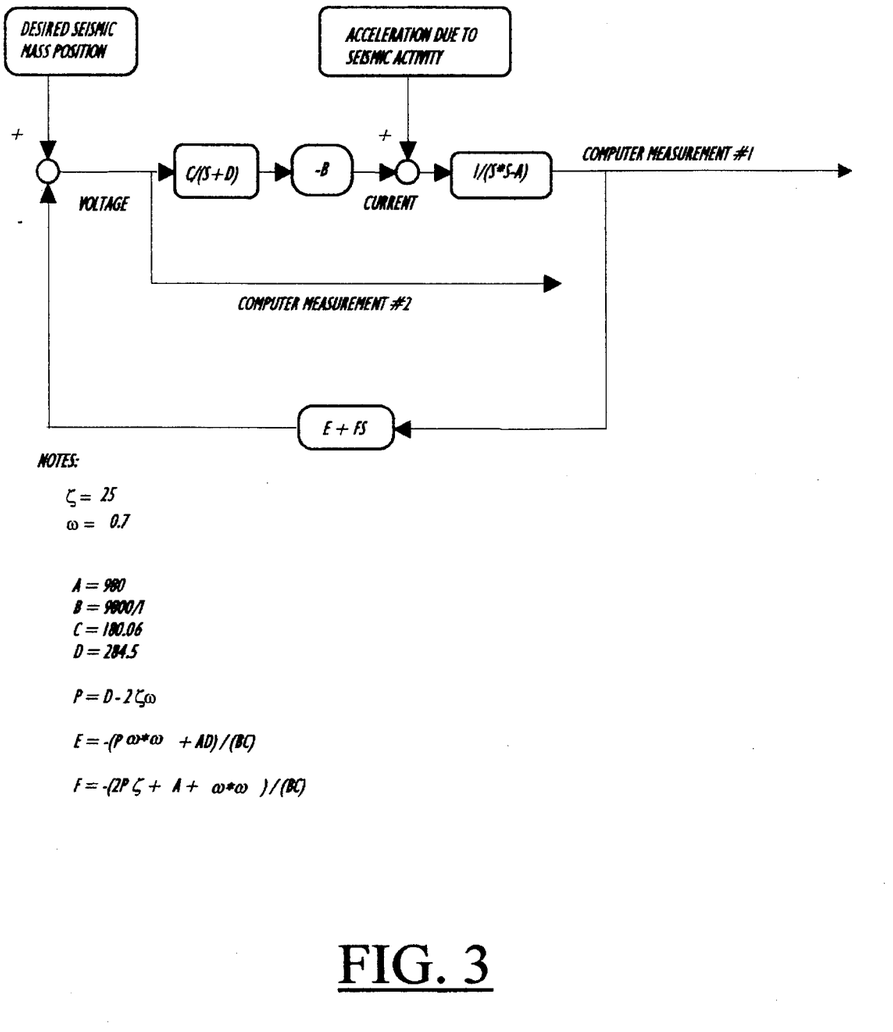
FIG. 3 shows a closed loop block diagram for one of the four controllers

FIG. 3 shows the mathematical block diagram of each controller in the control system assembly (6) through rigorous mathematical analysis simulation and actual construction, it is shown that the controllers will operate to levitate the seismic mass and will maintain it's position. The actual operation and mathematical proof will become evident in the Magnetic Suspension Seismometer-Dynamic analysis.

Figure 4:
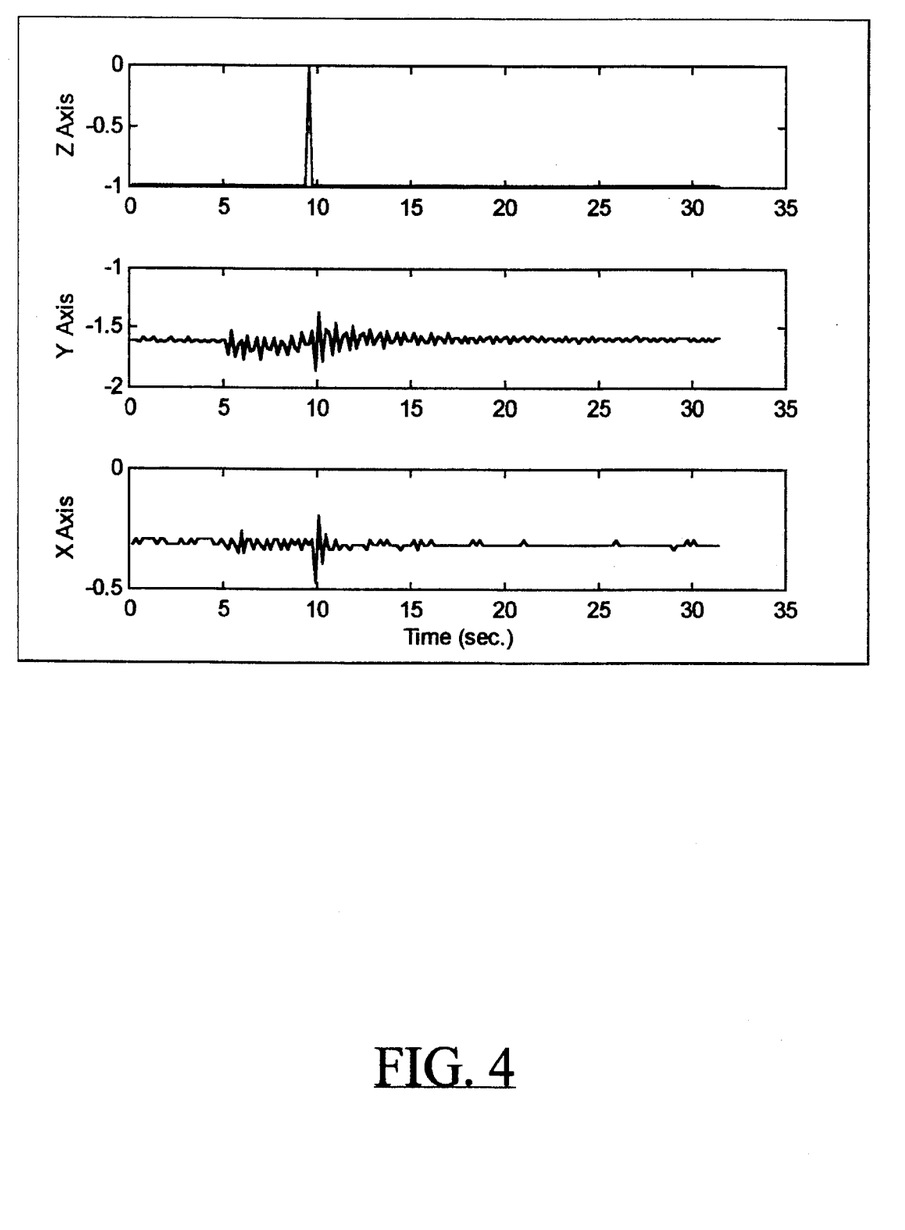
FIG. 4 shows an Impulse Response of this invention in the X, Y, Z directions.

FIG. 4 shows an impulse response of the present invention in the X,Y,Z directions. The seismic disturbance was induced at time 3.5 seconds after the MSS was powered up. Clearly, the MSS responded as expected.

Figure 5:
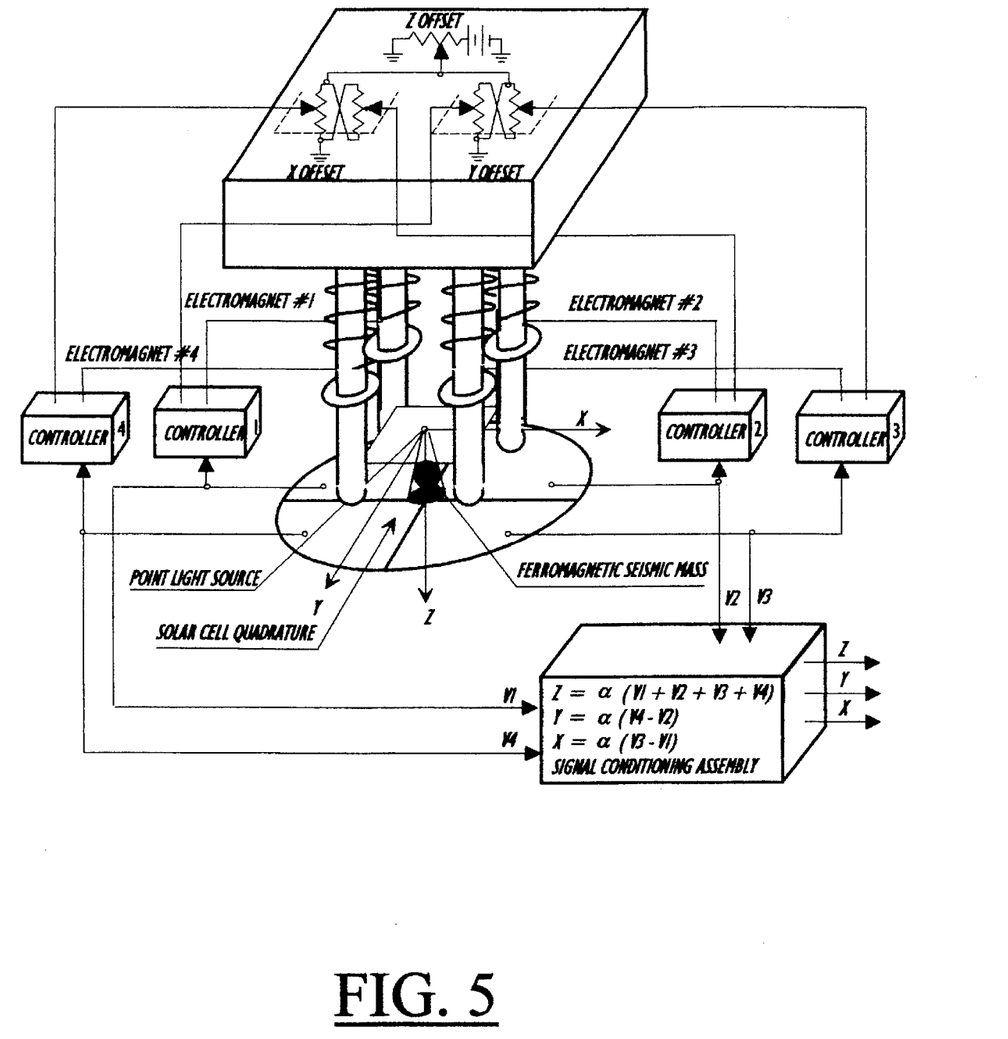
FIG. 5 is an exploded perspective and the selected coordinate system.

FIG. 5 is an exploded view of the MSS. Four electromagnets in the electromagnetic actuation assembly (1) collectively position the ball at the desired position. The feedback for each controller is offset in a coordinated fashion to ensure linearity and stable operation.

Operation

The electrical schematic corresponding to controller #1 of proposed Magnetic Suspension Seismometer is shown in FIG. 2. This schematic depicts only a portion of electromagnetic actuation assembly (1) namely; the electromagnet #1 and the small 12 VDC light bulb. This schematic also depicts the sensor assembly (3), the, signal conditioning assembly (4) and two subassemblies of the controller #1.

The digital computer serves as data acquisition unit and in it's most general case may replace the control system assembly (6). The Analog Computer assembly in the controller #1 closes the loop by reading the voltage of the solar cell quadrant #1 comparing that to the desired offset voltage and thus generating an error signal. The analog computer further processes the ,error signal to obtain a signal which is linear combination of proportional and derivative of incoming error signal. This signal is further amplified to provide sufficient power for electromagnet #1. The varistor across the electromagnet #1 prevents the surge current to enter the power transistor during rapid transistor operation. The one Ohm resistance provides a way to measure the current in the electromagnet #1. The digital computer may be programmed to read either the (X,Y,Z) position provided by the signal conditioning assembly (4) or may read the voltage across the one Ohm resistor in the emitter of the power transistor.

The analog computer assembly in controller #1 uses an operational amplifier capable of taking a derivative and performing summation and providing amplification. The potentiometer VR1 and VR2 are used to adjust the sensitivity of the MSS. As depicted in FIG. 5 the X position is obtained by subtracting the voltage of solar cell quadrant #1 from voltage of solar cell quadrant #3. This is physically implemented in the first operational amplifier of signal processing assembly (4), Similarly, the Y position is obtained by subtracting the voltage of solar cell quadrant #2 from the voltage of solar cell quadrant #4. The physical implementation is realized in the second operational amplifier of signal processing assembly (4). Finally, to obtain the Z position the voltages of all quadrants are added which is realized in the third operational amplifier of the signal conditioning assembly (4).

MAGNETIC SUSPENSION SEISMOMETER

DYNAMIC ANALYSIS

The motion of the seismic mass is governed by two force fields, namely; the gravitational field of the earth, and the vector sum of magnetic field of the electromagnets. The gravitational force tends to accelerate the seismic mass in a downward direction while the sum total magnetic force tends to accelerate the seismic mass in the upward direction. In the horizontal plane the only force acting on the ferromagnetic seismic mass is the vector sum magnetic force produced by each electromagnet.

Vertical Direction

Mathematically, the motion of seismic mass can be expressed as:

$$\ddot{z} = g\left(\frac{z}{z_0}\right) - g\left(\frac{i}{i_0}\right) + \delta \qquad (1)$$

Where, z represents the vertical position of the seismic mass g represents gravitational acceleration (9800 mm/(sec. sec)), i is the sum total of currents in all of four electromagnets, $z_0$, $i_0$ represent the nominal position and nominal current, respectively. The perturbation due to seismic activity or any other disturbances are represented by $\delta$. The above equation in the frequency domain will be:

$$s^2 Z(s) = \frac{g}{z_0}(Z(s)) - \frac{g}{i_0}(I(s)) + \Delta(s) \qquad (2)$$

Assume $\Delta(s)$ is negligible, we obtain:

$$\left(s^2 - \frac{g}{z_0}\right) Z(s) = -\frac{g}{i_0} (I(s)) \quad (3)$$

$$\frac{Z(s)}{I(s)} = \frac{-g/i_0}{s^2 - g/z_0} = \frac{-b}{s^2 - a} \quad (4)$$

The actuator consists of a power transistor which converts voltage to current and an electromagnet which converts current to magnetic force field. The mathematical model relating the applied voltage and the current in the electromagnet can be written as:

$$L \frac{di}{dt} + Ri = hv \quad (5)$$

where V is the applied voltage to the transistor, R is the resistance of the electromagnet and L is the inductance of the electromagnet. In the frequency domain:

$$LsI(s) + RI(s) = hV(s) \quad (6)$$

$$(Ls+R) I(s) = hV(s) \quad (7)$$

The transfer function for the actuator dynamics therefore can be written as:

$$\frac{I(s)}{V(s)} = \frac{h}{Ls+R} = \frac{h/L}{s+R/L} = \frac{c}{s+d} \quad (8)$$

Assuming a proportional and derivative type feedback is capable of suppressing $\delta(t)$, the closed loop Transfer Function becomes:

$$\frac{Z(s)}{V(s)} = \frac{-bc}{s^3 + ds^2 + (-a + Fbc)s + Ebc - ad} \quad (9)$$

FIG. 3 shows the overall closed loop system corresponding to Equation (9). The proportional and derivative gains are selected to stabilize the system. Therefore factoring out the denominator $$\frac{Z(s)}{V(s)} = \frac{-bc}{(s+p)(s^2 + 2\sigma\omega_n s + \omega_n^2)} \quad (10)$$

of Equation (9) and forcing the like terms to be equal we obtain:

$$p = d - 2\sigma\omega_n \quad (11)$$

And therefore:

$$E = \frac{p\omega_n^2 + ad}{bc} \quad (12)$$

likewise the derivative gain is expressed as:

$$F = \frac{a + \omega_n^2 + 2p\sigma\omega_n}{bc} \quad (13)$$

At the steady state condition, the seismic mass will levitate at the distance $$z_{nom} = \frac{-(bc)(v_{bias})}{(d - 2\sigma\omega_n)\omega_n^2} \quad (14)$$

As it can be seen the gravitational acceleration does not enter into the above equation. Therefore, as the device is taken to higher altitudes the current in the inductor will decease to keep the seismic mass in the nominal position. Thus either altitude or gravitational field strength may be deduced. Furthermore, $\omega_n$ and $\sigma$ may be selected such that the seismometer response correspond to response of certain combination of spring and mass in a conventional seismometer, and thus a virtual spring is realized. In addition, the damping factor $\sigma$ also becomes adjustable.

Horizontal Motion

The ferromagnetic seismic mass motion in horizontal plane may be analyzed by considering forces induced by two opposing electromagnets. For instance the pair of electromagnet #2 and #4 induce forces in x direction and the pair of electromagnet #1 and #3 induce forces in the y direction. Due to symmetry only motion in x direction will be analyzed here. Expressing this in mathematical terms, we have:

$$\ddot{x} = \alpha i_2(D/2-x) - \alpha i_4(D/2+x) + \delta \quad (15)$$

Where, x represents the horizontal position of the seismic mass, D represents the distance between the two electromagnet, $i_2$, $i_4$ are the currents thru electromagnet #2 and electromagnet #4 respectively. $\alpha$ is a proportionality constant. The perturbation due to seismic activity or any other disturbances are represented by $\delta$. Rearranging the terms and ignoring the perturbation we have:

$$\ddot{x} = \alpha(i_2+i_4)x = \alpha(i_2-i_4)D/2 \quad (16)$$

The controllers are designed to keep the total current constant, which effectively linearize Eq(16). The control law corresponding to, each electromagnet in x direction uses the same actuation mechanism therefore the actuation tag may be ignored, The resulting currents in the electromagnet #1 may be expressed as:

$$i_2 = K_1(D/2-x) - K_2\dot{x} \quad (17)$$

Where $K_1 = cE/d$ and $K_2 = cF/d$. Similarly the current in the electromagnet #2 becomes;

$$i_4 = K_1(D/2+x) + K_2\dot{x} \quad (18)$$

Now Eq(16) may be written as:

$$\ddot{x} + \alpha K_2 D\dot{x} + 2\alpha K_1 Dx = 0 \quad (19)$$

The second term in Eq(19) demonstrates the damping present in the x direction which is adjustable as described by Eq(13) of the previous section. Furthermore, the stiffness in the horizontal plane is also adjustable as described by Eq(12).

SENSITIVITY OF MSS

In the presence of seismic activity or any other external acceleration the perturbation $\delta(t)$ is not zero, therefore;

$$Z(s) = \frac{-bc[V(s)] + \Delta(s)(s+d)}{(s+p)(s^2 + 2\sigma\omega_n s + \omega_n^2)} \quad (20)$$

The steady state position of the seismic mass under constant acceleration will be:

$$z_{ss} = z_{nom} + \frac{(\alpha d)}{(d - 2\sigma\omega_n)\omega_n^2} \quad (21)$$

Therefore; the steady state sensitivity may be computed from:

$$\frac{\text{Changes in seismic mass position}}{\text{Acceleration}} = \frac{d}{(d - 2\sigma\omega_n)\omega_n^2} \quad (22)$$

As Eq(22) indicates, the desired sensitivity may be achieved by proper selection of sigma and omega.

CONCLUSIONS, RAMIFICATIONS, AND SCOPE

Accordingly, it can be seen that the Magnetic Suspension Seismometer can accurately measure induced vibrations, altitude, and gravitational perturbations.

Although the description above contains many specificities, these should not be construed as limiting the scope of the invention but as merely providing illustrations of some of the presently preferred embodiments of this invention. Various other embodiments and ramifications are possible within it's scope. For example, the Magnetic Suspension Seismometer could be designed to measure accelerations in a symmetrical 3-axis, or different motion detectors or proximity sensors could be used to detect movement of the suspended seismic mass. Thus the scope of the invention should be determined by the appended claims and their legal equivalents, rather than by the examples given.

---

C++ Program

```
/* C program to display output of Magnetic Suspension Seismometer */
/* Written by: Dorek Biglari       3/94 */
#include <stdlib.h>
#include <stdio.h>
#include <conio.h>
#include <dos.h>
#include "ml16drvc.h"
#include <graphics.h>
#define SIZE4 4
#define SIZE2 2
/* These are the parameters that are passed to the driver, they must be
global or the driver Will not find their segment. */
int    param[5],task,statcode;
int    buffer[100];
//Calls ML 16-P Driver
void call_driver( )
{
ml16drv(FP_OFF(&task),FP_OFF(param),FP_OFF(&statcode));
/* this section checks for an error code */
if (statcode>0)
{
   printf("A status error code of % i was detected. ",statcode);
   printf("Program terminated.");
   }
}/*end call_driver */
void main(void)
{
int gate,F,Xn;
int ij,gdriver = DETECT, gmode, gerr;
long counter = 0;
float a[1200];
   float z,B;
float T = 1.937/10000;         */ 10000 loops takes 1.9 seconds*/
float Yn,Yn1;
float Mult;
/* Get time */
   int hour;
   int minutes;
   int seconds;
   struct dostime_t theTime;
   char *ampm = "pm";
   _dos_gettime(&theTime);
   hour = theTime.hour;
if(hour<12)
      ampm = "am";
   else
   if (hour>12)
         hour = 12;
   minutes = theTime.Minute;
   seconds = theTime.second;
/* Initialize Graphics Driver */
   initgraph(&gdriver, &gmode, "c:[\]borlandc[\]bgi");
   gerr = graphresult( );
   if (gerr != gook)
{
   printf ("BGI error: % s ", graphefformsg(gerr));
   exit(gerr);
}
   task = 0;              // Setup driver
   param[0] = 0 x 220;       // Set Base Address to 220 hex.
   param[1] = 0;            // 0 would be differential mode inputs, 1 would be
                      // Single Ended.
   param[2] =1;             // 1 would be bipolar mode, 0 would be unipolar.
   param[3] =2;             // IRQ line jumpered on board
   call_driver( );
/* Begin the conversion */
   task = 1;        /* Analog Output Task */
```

```
        F = 100;
        Mult = (1/(1 + F * T));
        B = 0;
        i = 0;
        setcolor(14);
/* Print text on screen */
        settextstyle(TRIPLEX_FONT,HORIZ_DIR,SIZE4);
        outtextxy(160,20,"Magnetic Suspension");
        outtextxy(230,50,"Seismometer");
        settextstyle(1,HORIZ_DIR,SIZE2);
        setcolor(10);
        outtextxy(500,350,"Time(ms)");
        outtextxy(39,350,"0");
        outtextxy(130,350,"10");
        outtextxy(255,350,"20");
        outtextxy(380,350,"30");
        outtextxy(0,450,buffer);
        settextstyle(TREPLEX_FONT,VERT_DIR,SIZE2);
        outtextxy(0,220,"Volts");
        ounextxy(16,235,"0");
        ouftextxy(16,150,"5");
        outtextxy(16,320,".5");
        bar (39,150,639,350);
        setcolor(14);
        printf("Time: % d: % d: % d % s/n", hour, minutes, seconds, ampm);
        while (statcode==0) /* loop until driver error */
        {
        z+=1;
        if (z>600)
            {
                z = 0;
                bar (39,150,639,350);
/*          Get and print out time */
                _dos_gettime(&theTime);
                hour = theTime.hour;
                minutes = theTime.minute;
                seconds = theTime.second;
                gotoxy(1,1);
                printf ("Time: % d:% d:% d % s ", hour, minutes, seconds, ampm);
        }
        i+=1;
        if (i>600)
            {
                i = 0
                B = 0;
                for (j = 0; j <= 600; j++)
                {
                    B += a[j]/600;
                }
            }
            counter++;
            param[0] = 1;    /* A/D Channel #1 */
            param[1] = 1;    /* 0 = 255 mV, 1 = 10 V range */
            call_driver( );  /* go set the DAC    */
            gate = param[2];
/* This portion filters out digitization error */
            Xn = gate;
            Yn1 = Yn;
            Yn = Mult * Yn1 + T * F * Mult * Xn;
            a[i] = Yn* 10;
            if (((a[i]+250B)<350) && ((a[i]+250B)>150))
                putpixel ((z)+39,a[i]B+250,9);
            if (counter==10000)
                return;
        }
    }
                    End of C++ program
```

What we claim is:

1. A multi-axis magnetic suspension seismometer, comprising:

a. A magnetically shielded support structure, b. A single ferromagnetic seismic mass, configured to move with three translational degrees of freedom in a confined region, c. A four-vector magnetic field, comprised of four electromagnets, designed to position the said seismic mass and maintain it's position by exerting a restoring farce in all three axis (X,Y,Z), wherein, (X,Y) axis are designated to represent the horizontal plane while the Z axis is designated to represent the vertical direction, d. An incandescent light bulb positioned directly above the said seismic mass, e. A sensor assembly, comprised of four quadrature solar cells detecting means, configured to simultaneously detect the (X,Y,Z) position of said seismic mass based on the shadow casted by the said seismic mass, f. A control assembly, comprised of four adjustable feedback controllers to maintain the position of said seismic mass within the said confined region normally located below the said electromagnets and above the said sensor assembly, g. A signal conditioning assembly for discrimination and amplification of (X,Y,Z) signals generated by the sensor assembly$_x$.

2. A multi-axis magnetic suspension seismometer in accordance with claim 1 wherein the combined current for magnetic field generation is a measure of local gravitational field strength.

3. A multi-axis magnetic suspension seismometer in accordance with claim 1, wherein the position and the size of the shadow of the said seismic mass, produces a voltage distribution in the said sensor assembly indicative of both horizontal and Vertical seismic motion.

4. The seismometer of claim 1, wherein each said adjustable feedback controller further comprises either an analog computer or a digital computer and a servo assembly.

5. The seismometer of claim 1 further including a proximity detector means for detecting the position of said seismic mass.

6. The seismometer of claim 1, wherein the said control assembly further comprises electronic means to adjust, the seismometer's sensitivity range.

7. The seismometer of claim 1, wherein the voltage difference in two opposing solar cell quadratures is a measure of seismic activity in the direction indicated by the bisector of the two solar cell quadratures.

8. The seismometer of claim 1, wherein the sum total of voltages of all solar cell quadratures is a measure of seismic activity in the direction perpendicular to the solar cell surfaces.

9. The system of claim 1, wherein the steady state deviation of the seismic mass from the origin designated by the junction of all four solar cell quadratures, is a measure of acceleration in the horizontal plane.

10. The system of claim 1, wherein the said four-vector magnetic field is a linear function of pitch and roll of the said magnetically shielded support structure, and therefore provides a measure of rotational vibration or attitude determination in two axis of x and y.

* * * * *